(12) United States Patent
Owens

(10) Patent No.: US 11,165,649 B1
(45) Date of Patent: Nov. 2, 2021

(54) FILTER-BASED COMPOSITION OF NETWORKING DEVICE CONFIGURATION

(71) Applicant: CradlePoint, Inc., Boise, ID (US)

(72) Inventor: Cory Owens, Boise, ID (US)

(73) Assignee: CRADLEPOINT, INC., Boise, ID (US)

( * ) Notice: Subject to any disclaimer, the term of this patent is extended or adjusted under 35 U.S.C. 154(b) by 0 days.

(21) Appl. No.: 17/026,564

(22) Filed: Sep. 21, 2020

(51) Int. Cl.
*H04L 12/24* (2006.01)
*G06F 16/955* (2019.01)

(52) U.S. Cl.
CPC ........ *H04L 41/0883* (2013.01); *G06F 16/955* (2019.01); *H04L 41/0806* (2013.01); *H04L 41/0846* (2013.01); *H04L 41/0873* (2013.01)

(58) Field of Classification Search
CPC ......... H04L 41/08–082; H04L 41/0866–0886; H04L 41/22
See application file for complete search history.

(56) References Cited

U.S. PATENT DOCUMENTS

| | | | | |
|---|---|---|---|---|
| 5,968,176 A * | 10/1999 | Nessett | ............... | H04L 63/02 726/11 |
| 6,760,761 B1 * | 7/2004 | Sciacca | ............... | H04L 29/06 709/220 |
| 6,952,703 B1 * | 10/2005 | Kathail | ............... | H04L 41/085 |
| 7,398,323 B1 * | 7/2008 | Gerraty | ............... | H04L 41/0803 709/223 |
| 8,601,099 B1 * | 12/2013 | Zenz | ............... | H04L 41/0813 709/220 |
| 8,938,470 B1 * | 1/2015 | Kumbhari | ............ | H04L 41/0813 707/769 |
| 9,380,027 B1 * | 6/2016 | Lian | ............... | H04L 63/0263 |
| 2002/0116485 A1 * | 8/2002 | Black | ............... | H04L 63/083 709/223 |
| 2007/0156641 A1 * | 7/2007 | Mueller | ............ | H04L 41/0806 |
| 2010/0042834 A1 * | 2/2010 | Moret | ............... | H04L 41/0806 713/168 |
| 2011/0238805 A1 * | 9/2011 | Signori | ............ | H04L 41/0816 709/223 |
| 2013/0018994 A1 * | 1/2013 | Flavel | ............... | H04L 41/0843 709/220 |
| 2017/0359250 A1 * | 12/2017 | Voit | ............... | H04L 45/28 |
| 2019/0028364 A1 * | 1/2019 | Keller | ............... | G06F 9/45558 |
| 2020/0195501 A1 * | 6/2020 | Shenoy | ............ | H04L 41/0859 |
| 2021/0067406 A1 * | 3/2021 | Myers | ............... | H04L 41/082 |
| 2021/0141648 A1 * | 5/2021 | Halim | ............... | H04L 41/085 |

* cited by examiner

*Primary Examiner* — Brendan Y Higa
(74) *Attorney, Agent, or Firm* — Parsons Behle & Latimer

(57) ABSTRACT

Disclosed embodiments include systems and methods for filter-based composition of network device configuration including a database associating network devices in management with data points of interest, a network server that communicates over a network with the database and at least one network device in management, and a configuration filter module, stored at least in part on the network server, and including rules for configuring the at least one network device in management.

14 Claims, 4 Drawing Sheets

FILTER-BASED COMPOSITION OF NETWORKING DEVICE CONFIGURATION

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2020, Cradlepoint, Inc. All Rights Reserved.

FIELD OF THE DISCLOSURE

This disclosure relates generally to networking systems and devices. More particularly, this disclosure relates to systems and methods for automatically configuring network devices as they come under network management.

BACKGROUND

In most existing networks systems, there is no elegant way to configure every networking device under network management based on the device's capabilities. Moreover, there is typically no way for configuration to be applied to devices as soon as they come under network management without a manual configuration step.

Current network device configuration systems and methods are usually centered around "groups" of devices. Devices are added to a group, and that group is associated with a configuration, which is then applied to each constituent device. These groups are, typically, limited by two main factors: (1) all constituent group devices must be the same product model, and (2) they must be on the same version of firmware. This is limiting, as there are plenty of use cases where a user would want to apply configuration to multiple devices across product models and/or firmware versions. Furthermore, a user must explicitly, and usually manually, add each device to a group. Other drawbacks, inconveniences, and inefficiencies also exist with current systems and methods.

SUMMARY

Accordingly, disclosed embodiments address the above-noted, and other, drawbacks, inconveniences, and inefficiencies of existing systems and methods. Disclosed embodiments include systems for filter-based composition of network device configuration, the system including a database associating network devices in management with data points of interest, a network server that communicates over a network with the database and at least one network device in management, and a configuration filter module, stored at least in part on the network server, and including rules for configuring the at least one network device in management.

In some embodiments the configuration filter module further comprises a user customization module that enables a user to configure the data points of interest for the at least one network device in management.

In some embodiments the data points of interest comprise one or more of: network device capabilities, network device physical location, network device permissions, network device access type, and network device licenses.

In some embodiments the rules for configuring the at least one network device in management further comprise a configuration snippet comprising an assignable priority.

In some embodiments the configuration filter module further comprises a collection module that collects applicable configuration snippets based at least in part on the assignable priority.

In some embodiments the collection module generates a final configuration file that is communicated to the at least one network device in management.

In some embodiments the final configuration file is communicated to the at least one network device in management over the network.

In some embodiments the at least one network device in management comprises a router.

Also disclosed are methods for filter-based composition of network device configuration including maintaining a database associating network devices in management with data points of interest, and communicating over a network with a network server to the database and at least one network device in management to access a configuration filter module, stored at least in part on the network server, and that includes rules for configuring the at least one network device in management.

In some embodiments the methods include enabling a user to access a user customization module that enables a user to configure the data points of interest for the at least one network device in management.

In some embodiments the rules for configuring the at least one network device in management further comprise a configuration snippet and the configuration filter module enables the assignment of a priority to the configuration snippet.

In some embodiments the configuration filter module further enables a collection module to collect applicable configuration snippets based at least in part on the assigned priority.

In some embodiments the collection module generates a final configuration file that is communicated to the at least one network device in management.

In some embodiments the final configuration file is communicated to the at least one network device in management over the network.

Figure 1:
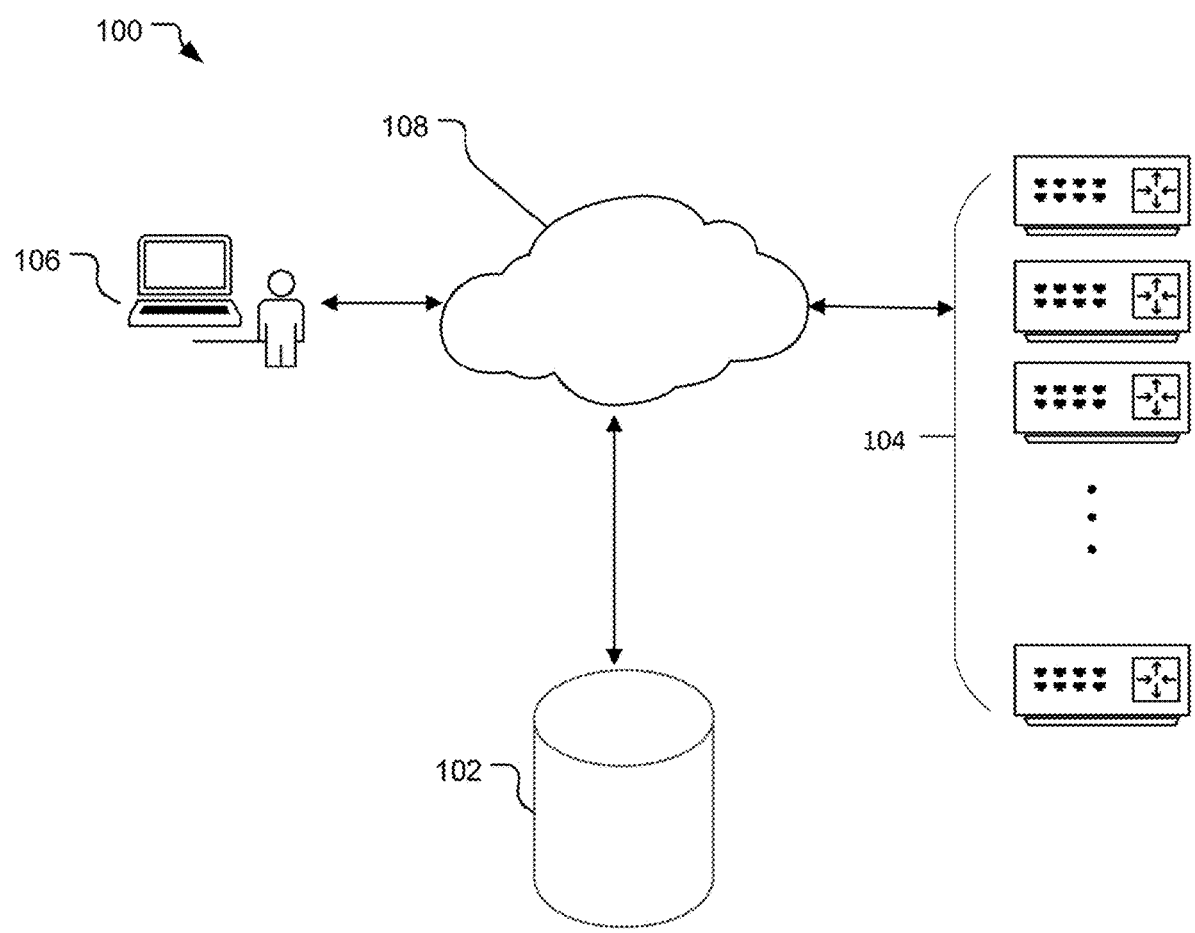
FIG. 1 is a schematic illustration of a network usable with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

As persons of ordinary skill in the art having the benefit of this disclosure would understand, for ease of description herein a network device (also referred to as a networking device) may be embodied and/or described in terms of a computing device. However, it should further be understood that this description should in no way be construed that claimed subject matter is limited to one embodiment, such as a computing device or a network device, and, instead, may be embodied as a variety of devices or combinations thereof.

Furthermore, persons of ordinary skill in the art having the benefit of this disclosure would understand, the term network device refers to any device capable of communicating via and/or as part of a network. While network devices may be capable of sending and/or receiving signals (e.g., signal packets), such as via a wired or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as non-limiting examples, dedicated rack-mounted servers, routers, wireless access points, gateways, hubs, switches, hosts, mobile devices, servers, client-devices, network address translation (NAT) devices, desktop computers, laptop computers, set top boxes, tablets, netbooks, smart phones, integrated devices combining two or more features of the foregoing devices, or the like, or any combination thereof.

A network device comprises a device capable of communicating via a network, as mentioned. A computing device comprises a device capable of executing computer (i.e., software or firmware) instructions. Thus, for example, network devices may comprise computing devices, non-computing devices, and/or other devices.

A server, which may comprise a computing device, may also operate as network device, by serving content over a network. For example, a server may provide now known and/or to be later developed, service arrangements, derivatives, and/or improvements, including past, present, and/or future services comprising, but not limited to, web services, third-party services, audio services, video services, email services, instant messaging (IM) services, SMS services, MMS services, voice over IP (VOID) services, calendaring services, photo services, database services, facsimile services, file services, domain name services, game services, printing services, proxy services, data streaming services, peer-to-peer services, other services, the like or any combinations thereof. Examples of content may include text, images, audio, video, the like, or any combinations thereof, which may be processed in the form of physical signals, such as electrical signals, for example, or may be stored in memory, as physical states, for example.

A network may comprise two or more network devices in communication and/or may couple network devices so that signal communications, such as in the form of signal packets, for example, may be exchanged, such as between a server and a client device and/or other types of devices, including between wireless devices coupled via a wireless network, for example.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. In this context, the term sub-network refers to a portion or part of a network. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link or connection between otherwise separate and/or independent LANs. In this context, a private network refers to a particular, limited set of network devices able to communicate with other network devices in the particular, limited set, such as via signal packet transmissions, for example, without a need for re-routing and/or redirecting such network communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain, may comprise an example of a private network. It is understood in this context that a private network may provide outgoing network communications to devices not in the private network, but such devices outside the private network may not direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known or later developed. The Internet includes local area networks (LANs), wide area networks (WANs), wireless networks, and/or long haul public networks that, for example, may allow signal packets to be communicated between LANs. The term world wide web (WWW) and/or similar terms may also be used, although it refers to a sub-portion of the Internet that complies with the Hypertext Transfer Protocol or HTTP. It is noted that there are several versions of the Hypertext Transfer Protocol. Here, the term Hypertext Transfer Protocol or HTTP is intended to refer to any version, now known or later developed. It is likewise noted that in various places in this disclosure substitution of the term Internet with the term world wide web may be made without a significant departure in meaning and may, therefore, not be inappropriate in that the statement would remain correct with such a substitution.

Signal packets, also referred to as signal packet transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address. Although the Internet comprises a network of interoperable networks, not all of those interoperable networks are necessarily available or accessible to the public.

Disclosed embodiments improve on server-based networking device management solutions. As shown in FIG. 1, in some embodiments the system 100 records in a database 102 all network devices 104 in management with various data points of interest (e.g., device capabilities, physical location, permissions, access type, licenses, etc.), and that configuration of these network devices 104 is communicated from the server (part of user 106 network) to the network devices 104 through an over-the-network method (e.g., on network 108). As persons of ordinary skill in the art having the benefit of this disclosure would understand, the types of data points of interest may vary depending upon, among other things, the type of network device 104, the type of network 106, user preferences, and the like.

In some embodiments, a user (e.g., user 106) will define filters, which are sets of rules for selecting networking devices 104. For example, a configuration rule may be "all devices are capable of Wi-Fi" or "all devices tagged 'mobile.'" Each configuration rule is associated with a configuration snippet 202A-202N. For example, configuration snippets 202A-202N may comprise code lines like "WiFi password='Password1!'" or "data usage monitoring enabled=True." Filters 200 may be sorted in priority order by the user 106. For each networking device 104 in management, all applicable filters 200 are collected. This, in turn, results in a collection of configuration snippets 202A-202N. These configuration snippets 202A-202N are layered on top of each other in the order of priority of their filters, with any conflicts (i.e. two or more snippets attempting to modify the same section of the configuration) being resolved by this priority, with the highest priority snippet taking precedence. This final configuration file 204 is then communicated to the networking device 104 through whichever communication channel (e.g., network 108) is used by that user 104.

Figure 2:
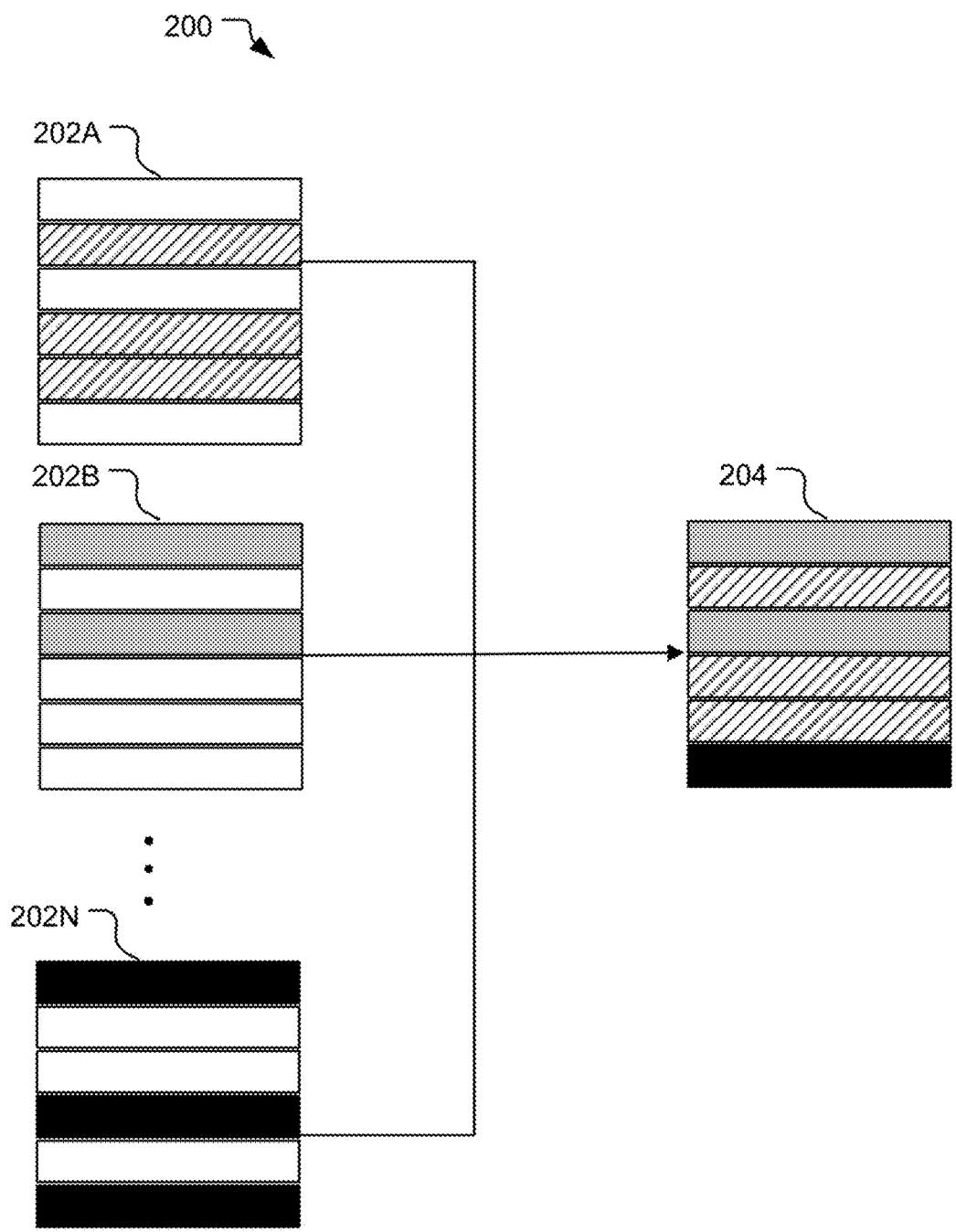
FIG. 2 is a schematic illustration of configuration filter layering in accordance with disclosed embodiments.

FIG. 2 is a schematic illustration of configuration filter layering in accordance with disclosed embodiments. As those of ordinary skill in the art having the benefit of this disclosure would understand, a filter 200 may comprise server code (e.g., a cloud-based server in a cloud-based network management system) that is a network device 104 selection mechanism that filters how an event is handled. For example, events such as new device added, device unlicensed, device re-licensed, device security changed, device renamed, and the like, may be coded and given priorities in the configuration filter 200.

As schematically shown in FIG. 2, a filter 200 may comprise a number of configuration snippets 202A, 202B, . . . , 202N. The various shaded (or hatched) lines correspond to configuration settings and are each assigned a priority and compiled into a final configuration file 204. Conflicts in configuration settings are resolved by priority. For example, position 1 in configuration snippet 202B and position 1 in configuration snippet 202N potentially conflict, but (in this example) position 1 in configuration snippet 202B is assigned a higher priority and, thus, occupies position 1 in final configuration file 204. Further extending this example embodiment, when multiple configuration rules apply to a single network device 104, the rules are deterministic based on priority. For example, if configuration rule 1 is "all routers need Wi-Fi" and configuration rule 2 is "devices that are tagged as 'security' are Wi-Fi disabled" the priority for rule 2 may be set higher than the priority for rule 1 to ensure that security devices do not have Wi-Fi enabled. Of course, other rules, configurations, and priorities may also be used.

In some embodiments, individual network device 104 configuration needs to be re-compiled in three cases. First, when there is a change to the filters 200, their associated configuration snippets 202A-202N, or their priority order. Second, when a new network device 104 first comes under management. Third, when a network device's data points of interest change.

Embodiments of the filters 200 in accordance with the disclosure may be presented as pseudocode as follows:

```
update device configurations( ):
  all_filters.sort(key=priority)
  for each device in devices_in_management:
    old_config=device.config
    config_document=null
    for each filter in all_filters:
      if filter.applies_to(device):
        if not config_document:
          config_document=filterconfig
        else:
          config_document.add_if_not_present(filter.con-
            fig)
    if config_document and old_config!=config_document:
      device.send(config_document)
```

Figure 3:
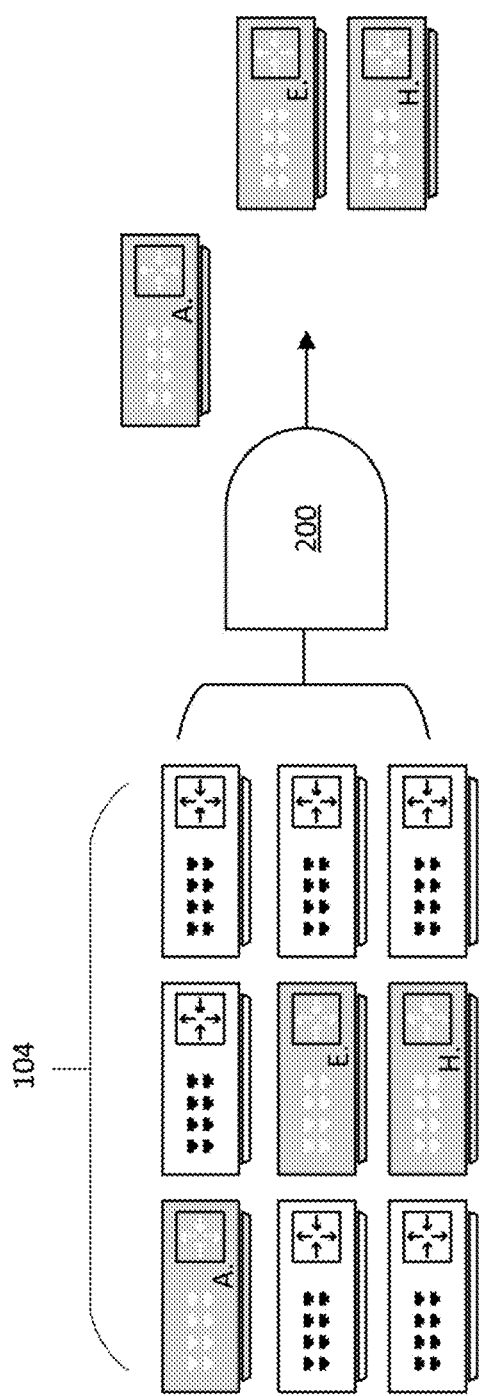
FIG. 3 is a schematic illustration of how filters select the network devices from an account in accordance with disclosed embodiments.

FIG. 3 is a schematic illustration of how filters 200 select the network devices 104 from an account in accordance with disclosed embodiments. As indicated schematically, a configuration change is made (e.g., password changed) that applies to three of the network devices 104A, 104E, and 104H. Filter 200 will apply the change to only those three network devices 104A, 104E, and 104H. As those of ordinary skill in the art having the benefit of this disclosure would understand, other filters 200, configuration changes, and affected devices 104 may also be used.

Figure 4:
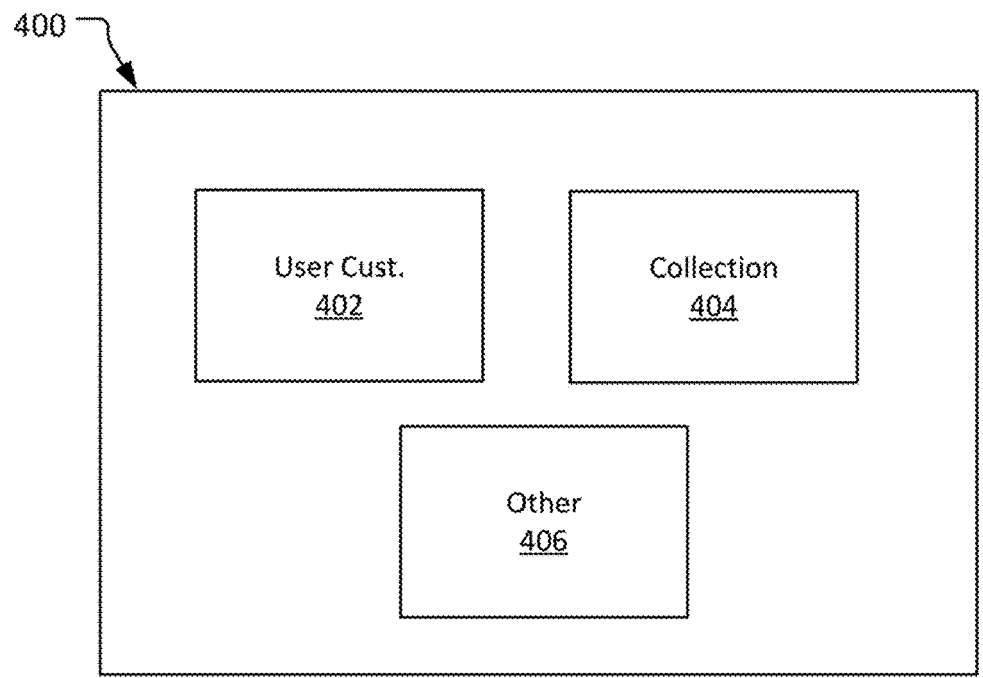
FIG. 4 is a schematic representation of a configuration filter module in accordance with disclosed embodiments.

FIG. 4 is a schematic representation of a configuration filter module 400 in accordance with disclosed embodiments. Configuration filter module 400 may be stored, at least in part, on a network server, and includes rules for configuring the network devices 104 in management. As also shown, configuration filter module 400 further comprises a user customization module 402 that enables a user 106 to configure the data points of interest for the network devices 104 in management. Embodiments of the configuration filter module 400 further comprises a collection module 404 that collects applicable configuration snippets 202A, . . . , 202N based at least in part on an assignable priority. Embodiments of the configuration filter module 400 may also comprise other modules 406.

Although various embodiments have been shown and described, the present disclosure is not so limited and will be understood to include all such modifications and variations are would be apparent to one skilled in the art.

What is claimed is:

1. A system for filter-based composition of network device configuration, the system comprising:
   a database associating network devices in management with data points of interest;
   a network server that communicates over a network with the database and at least one network device in management; and
   a configuration filter module, stored at least in part on the network server, and including rules for configuring the at least one network device in management wherein the rules for configuring the at least one network device in management further comprise a configuration snippet comprising an assignable priority.

2. The system for filter-based composition of network device configuration of claim 1 wherein the configuration filter module further comprises a user customization module that enables a user to configure the data points of interest for the at least one network device in management.

3. The system for filter-based composition of network devices configuration of claim 2 wherein the data points of interest comprise one or more of: network device capabilities, network device physical location, network device permissions, network device access type, and/or network device licenses.

4. The system for filter-based composition of network device configuration of claim 1 wherein the configuration filter module further comprises a collection module that collects applicable configuration snippets based at least in part on the assignable priority.

5. The system for filter-based composition of network device configuration of claim 4 wherein the collection module generates a final configuration file that is communicated to the at least one network device in management.

6. The system for filter-based composition of network device configuration of claim 5 wherein the final configuration file is communicated to the at least one network device in management over the network.

7. The system for filter-based composition of network device configuration of claim 1 wherein the at least one network device in management comprises a router.

8. A method for filter-based composition of network device configuration, the method comprising:
   maintaining a database associating network devices in management with data points of interest; and
   communicating over a network with a network server to the database and at least one network device in management to access a configuration filter module, stored at least in part on the network server, and that includes rules for configuring the at least one network device in management wherein the rules for configuring the at least one network device in management further comprise a configuration snippet and the configuration filter module enables the assignment of a priority to the configuration snippet.

9. The method for filter-based composition of network device configuration of claim 8 further comprising enabling a user to access a user customization module that enables a user to configure the data points of interest for the at least one network device in management.

10. The method for filter-based composition of network devices configuration of claim 9 wherein the data points of interest comprise one or more of: network device capabilities, network device physical location, network device permissions, network device access type, and/or network device licenses.

11. The method for filter-based composition of network device configuration of claim 8 wherein the configuration filter module further enables a collection module to collect applicable configuration snippets based at least in part on the assigned priority.

12. The method for filter-based composition of network device configuration of claim 11 wherein the collection module generates a final configuration file that is communicated to the at least one network device in management.

13. The method for filter-based composition of network device configuration of claim 12 wherein the final configuration file is communicated to the at least one network device in management over the network.

14. The method for filter-based composition of network device configuration of claim 8 wherein the at least one network device in management comprises a router.

* * * * *